United States Patent [19]

Watanabe et al.

[11] Patent Number: 5,294,685

[45] Date of Patent: Mar. 15, 1994

[54] PROCESS FOR PRODUCING A STYRENIC POLYMER HAVING A HIGH DEGREE OF SYNDIOTACTICITY

[75] Inventors: Masami Watanabe; Shoji Naganuma, both of Sodegaura; Norio Tomotsu, Ichihara, all of Japan

[73] Assignee: Idemitsu Kosan Co., Ltd., Tokyo, Japan

[21] Appl. No.: 79,860

[22] Filed: Jun. 22, 1993

Related U.S. Application Data

[63] Continuation of Ser. No. 842,997, Feb. 28, 1992, abandoned.

[30] Foreign Application Priority Data

Mar. 26, 1991 [JP] Japan .................. 3-084373

[51] Int. Cl.$^5$ .................. C08F 4/649; C08F 12/08
[52] U.S. Cl. .................. 526/134; 526/126;
526/128; 526/133; 526/141; 526/147; 526/160;
526/170; 526/346; 526/347.2; 526/293;
526/326; 526/334; 502/102; 502/103; 502/152;
502/167; 502/202
[58] Field of Search .............. 526/170, 134, 293, 326,
526/334, 126, 128, 133, 141, 147, 160; 502/152,
167

[56] References Cited

U.S. PATENT DOCUMENTS

| | | | |
|---|---|---|---|
| 5,064,802 | 11/1991 | Stevens et al. | 526/170 X |
| 5,066,741 | 11/1991 | Campbell, Jr. | 526/170 X |
| 5,153,157 | 10/1992 | Hlatky et al. | 526/132 X |

FOREIGN PATENT DOCUMENTS

| | | |
|---|---|---|
| 0224097 | 6/1987 | European Pat. Off. . |
| 0276801 | 8/1988 | European Pat. Off. . |
| 0277003 | 8/1988 | European Pat. Off. . |
| 0277004 | 8/1988 | European Pat. Off. ........ 502/117 |
| 0389981 | 10/1990 | European Pat. Off. . |
| 0421659 | 4/1991 | European Pat. Off. . |
| 62-187708 | 8/1987 | Japan . |
| 63-179906 | 7/1988 | Japan . |
| 63-241009 | 10/1988 | Japan . |
| WO91/14713 | 10/1991 | World Int. Prop. O. . |

OTHER PUBLICATIONS

Journal of Organometallic Chemistry, vol. 347, 1988, pp. C9-C11, R. Taube, et al.,: "XXX*. Cationic Alkyldicyclopentadienyltitanium Complexes as Catalysts for Ethylene Polymerization".

Journal of American Chemical Society, vol. 111, 1989, pp. 2728-2729, G. G. Hlatky, et al.,: "Ionic, Base-Free Zirconocene Catalysts for Ethylene Polymerization".

Organometallics, vol. 8, No. 12, 1989, pp. 2892-2903, R. F. Jordan, et al.,: "Synthesis and Chemistry of Cationic Alkyl, Alkenyl, and Allyl Complexes Derived from the Soluble, Cationic Hydride $(C_5H_4Me)_2Zr(H)$ $(THR)^+$".

*Primary Examiner*—Fred Teskin
*Attorney, Agent, or Firm*—Oblon, Spivak, McClelland, Maier & Neustadt

[57] ABSTRACT

There are disclosed a catalyst which comprises a specific transition-metal compound (A) and a specific coordination complex compound (B) instead of aluminoxane, and a process for producing a styrene polymer at a reduced cost with improved efficiency by the use of the above catalyst.

The catalyst according to the present invention is inexpensive compared with the conventional catalyst containing aluminoxane as the major ingredient, and exhibits a high activity in the polymerization of a styrenic monomer into styrene polymer with a high degree of syndiotacticity as well as a high yield and conversion rate.

5 Claims, No Drawings

PROCESS FOR PRODUCING A STYRENIC POLYMER HAVING A HIGH DEGREE OF SYNDIOTACTICITY

This application is a continuation of application Ser. No. 07/842,997, filed on Feb. 28, 1992, now abandoned.

BACKGROUND OF THE INVENTION

1. Field of the Invention

The present invention relates to a process for producing a styrenic polymer and a catalyst for use therein. More particularly, it pertains to a process for efficiently producing a styrenic polymer having a high degree of syndiotactic configuration in the stereochemical structure of the polymer main chain and to a catalyst to be used for the process.

2. Description of the Related Arts

It has recently been disclosed by the research group of the present inventors that a styrenic polymer having a syndiotactic configuration is obtained by polymerizing a styrenic monomer by the use of a catalyst comprising as primary ingredients a transition-metal compound, especially a titanium compound and an alkylaluminoxane (Refer to Japanese Patent Application Laid-Open Nos. 187708/1987, 179906/1988, 241009/1988, etc.).

Methylaluminoxane, particularly suitable as an alkylaluminoxane is obtained usually by the reaction between trimethylaluminum and water. However, the above-mentioned reaction involves the problem that the reaction is difficult to put into practical production because of its violent reaction, and further suffers the disadvantage that in addition to requiring expensive trimethylaluminum as the starting material, an excessively large amount of methylaluminoxane is required as a component of the catalyst as compared with the quantity of a transition metal, thus causing an extremely expensive catalyst.

There has recently been reported that a polymerization catalyst not containing aluminoxane is capable of polymerizing α-olefin (principally, ethylene) by R. Taube (J. Organomet. Chem. C9-C11, 347 (1988)), H. Turner (J. Am. Chem. Soc. 111,2728 (1989)), R. F. Jordan (Organomet. 8,2892 (1989)), etc. Nevertheless, investigation has not yet been made on a polymerization catalyst not containing aluminoxane for the polymerization of styrenic monomer, leaving the problem that styrenic monomer, different from α-olefin, is likely to be polymerized into an atactic polymer in the presence of a cationic species.

SUMMARY OF THE INVENTION

It is an object of the present invention to provide a process for effectively producing a styrenic polymer having a high degree of syndiotactic configuration.

It is another object of the present invention to provide a catalyst capable of efficiently polymerizing a styrenic monomer into a styrenic polymer having a high degree of syndiotactic configuration without the use of expensive aluminoxane required in a large quantity.

Other objects of the present invention will be obvious from the text of the specification hereinafter disclosed.

As the result of intensive research and investigation made by the present inventors for the purpose of attaining the above-described object, it has been found that the use of a catalyst combination comprising a specific transition-metal compound and a specific coordination complex compound is capable of efficiently producing the objective styrenic polymer having a high degree of syndiotactic configuration by virtue of its markedly improved activity. The present invention has been accomplished on the basis of the aforestated finding and information.

Specifically, the present invention provides a catalyst which comprises as primary ingredients (A) a transition-metal compound and (B) a coordination complex compound comprising an anion in which a plurality of redicals are bonded to a metal and a nitrogen-containing cation having an acid dissociation constant at 25° C. of 7 or less. The present invention also provides a process for producing a styrenic polymer which comprises polymerizing styrene and/or a styrene derivative in the presence of the foregoing catalyst.

DESCRIPTION OF PREFERRED EMBODIMENTS

The catalyst according to the present invention comprises as the primary ingredients, components (A) and (B). Various transition metals are available as the component (A) and mention may be made of the compounds of the metals belonging to Group III, IV, V or VI and Lanthanide Series in the Periodic Table and among them, the compounds of Group IV metals including titanium, zirconium, hafnium, etc. are preferable. A variety of titanium compounds are available and include, for example, at least one compound selected from the group consisting of the titanium compounds and titanium chelate compounds represented by the general formula:

$$\mathrm{TiR^1_aT^2_bR^3_cR^4_{4-(a+b+c)}} \qquad (I)$$

or

$$\mathrm{TiR^1_dR^2_eR^3_{3-(d+e)}} \qquad (II)$$

wherein $R^1$, $R^2$, $R^3$ and $R^4$ are each a hydrogen atom, an alkyl group having 1 to 20 carbon atoms, an alkoxy group having 1 to 20 carbon atoms, an aryl group having 6 to 20 carbon atoms, an alkylaryl group having 7 to 20 carbon atoms, an arylalkyl group having 7 to 20 carbon atoms, an acyloxy group having 1 to 20 carbon atoms, a cyclopentadienyl group, a substituted cyclopentadienyl group, an indenyl group or a halogen atom; a, b and c are each an integer of 0 to 4; and d and e are each an integer of 0 to 3.

$R^1$, $R^2$, $R^3$ and $R^4$ in the formulae (I) and (II) each represent a hydrogen atom, an alkyl group having 1 to 20 carbon atoms (specifically, methyl group, ethyl group, propyl group, butyl group, amyl group, isoamyl group, isobutyl group octyl group and 2-ethylhexyl group), an alkoxy group, having 1 to 20 carbon atoms (specifically, methoxy group, ethoxy group, propoxy group, butoxy group, amyloxy group, hexyloxy group, and 2-ethylhexyloxy group), an aryl group having 6 to 20 carbon atoms, an alkylaryl group, an arylalkyl group (specifically, phenyl group, tolyl group, xylyl group and benzyl group), an acyloxy group having 1 to 20 carbon atoms (specifically, heptadecylcarbonyloxy group), a cyclopentadienyl group, a substituted cyclopentadienyl group (specifically, methylcyclopentadienyl group, 1,2-dimethylcyclopentadienyl group and pentamethylcyclopentadienyl group), an indenyl group or a halogen atom (specifically, chlorine, bromine, iodine and fluorine). These $R^1$, $R^2$, $R^3$ and $R^4$ may be the same as or different from each other. Furthermore, a, b and c each are an integer of 0 to 4, and d and e each are an integer of 0 to 3.

More preferred titanium compounds include a titanium compound represented by the formula:

TiRXYZ  (III)

wherein R represents a cyclopentadienyl group, a substituted cyclopentadienyl group r an indenyl group; a substituted indenyl group or a fluorenyl group; X, Y and Z are independently a hydrogen atom, an alkyl group having 1 to 12 carbon atoms, an alkoxy group having 1 to 12 carbon atoms, an aryl group having 6 to 20 carbon atoms, an aryloxy group having 6 to 20 carbon atoms, an arylalkyl group having 7 to 20 carbon atoms or a halogen atom.

The substituted cyclopentadienyl group represented by R in the above formula is, for example, a cyclopentadienyl group substituted by at least one of an alkyl group having 1 to 6 carbon atoms, more specifically, methylcyclopentadienyl group, 1,2-dimethylcyclopentadienyl group, 1,2,4-trimethylcyclopentadienyl group, 1,2,3,4-tetramethylcyclopentadienyl group, trimethylsilylcyclopentadienyl group, 1,3-di(trimethylsilyl)cyclopentadienyl group, tert-butylcyclopentadienyl group, 1,3-di(tert-butyl)cyclopentadienyl group or pentamethylcyclopentadienyl group. In addition, X, Y and Z are each independently a hydrogen atom, an alkyl group having 1 to 12 carbon atoms (specifically, methyl group, ethyl group, propyl group, n-butyl group, isobutyl group, amyl group, isoamyl group, octyl group and 2-ethylhexyl group), an alkoxy group having 1 to 12 carbon atoms (specifically, methoxy group ethoxy group, propoxy group, butoxy group, amyloxy group, hexyloxy group, octyloxy group and 2-ethylhexyl group), an aryl group having 6 to 20 carbon atoms (specifically, phenyl group and naphthyl group), an aryloxy group having 6 to 20 carbon atoms (specifically, phenoxy group), an arylalkyl group having 7 to 20 carbon atoms (specifically, benzyl group) or a halogen atom (specifically, chlorine, bromine, iodine and fluorine).

Specific examples of the titanium compound represented by the formula (VIII) include
cyclopentadienyltrimethyltitanium,
cyclopentadienyltriethyltitanium,
cyclopentadienyltripropyltitanium,
cyclopentadienyltributyltitanium,
methylcyclopentadienyltrimethyltitanium,
1,2-dimethylcyclopentadienyltrimethyltitanium,
1,2,4-trimethylcyclopentadienyltrimethyltitanium,
1,2,3,4-tetramethylcyclopentadienyltrimethyltitanium,
pentamethylcyclopentadienyltrimethyltitanium,
pentamethylcyclopentadienyltriethyltitanium,
pentamethylcyclopentadienyltripropyltitanium,
pentamethylcyclopentadienyltributyltitanium,
cyclopentadienylmethyltitanium dichloride,
cyclopentadienylethyltitanium dichloride,
pentamethylcyclopentadienylmethyltitanium dichloride,
pentamethylcyclopentadienylethyltitanium dichloride,
cyclopentadienyldimethyltitanium monochloride,
cyclopentadienyldiethyltitanium monochloride,
cyclopentadienyltitanium trimethoxide,
cyclopentadienyltitanium triethoxide,
cyclopentadienyltitanium tripropoxide,
cyclopentadienyltitanium triphenoxide,
pentamethylcyclopentadienyltitanium trimethoxide,
pentamethylcyclopentadienyltitanium triethoxide,
pentamethylcyclopentadienyltitanium tripropoxide,
pentamethylcyclopentadienyltitanium tributoxide,
pentamethylcyclopentadienyltitanium triphenoxide,
cyclopentadienyltitanium trichloride,
pentamethylcyclopentadienyltitanium trichloride,
cyclopentadienylmethoxytitanium dichloride,
cyclopentadienyldimethoxytitanium monochloride,
pentamethylcyclopentadienylmethoxytitnaium dichloride,
cyclopentadienyltribenzyltitanium,
pentamethylcyclopentadienyltribenzyltitanium,
pentamethylcyclopentadienylmethyldiethoxytitanium,
indenyltitanium trichloride,
indenyltitanium trimethoxide,
indenyltitanium triethoxide,
indenyltrimethyltitanium and
indenyltribenzyltitanium.

Of these titanium compounds, a compound not containing halogen atom is preferred and a titanium compound having one π-electron type ligand is particularly preferred.

Furthermore, a condensed titanium compound represented by the following formula (IV) can be used as the titanium compound.

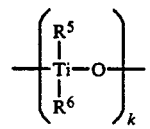

(IV)

wherein $R^5$ and $R^6$ each represent a halogen atom, an alkoxy group having 1 to 20 carbon atoms or an acyloxy group having 1 to 20 carbon atoms; and k is an integer of 2 to 20.

Furthermore, the above titanium compounds can be used in the form of a complex formed with an ester or an ether.

The trivalent titanium compound represented by the formula (IV) typically include a trihalogenated titanium such as titanium trichloride; and a cyclopentadienyltitanium compound such as cyclopentadienyltitanium dichloride, and also those obtained by reducing a tetravalent titanium compound. These trivalent titanium compounds can be used in the form of a complex formed with an ester or an ether.

In addition, the zirconium compound used as the transition metal compound includes tetrabenzylzirconium, zirconium tetraethoxide, zirconium tetrabutoxide, bisindenylzirconium dichloride, triisopropoxyzirconium monochloride, zirconium benzyl dichloride, cyclopentadienylzirconium trichloride, pentamethylcyclopentadienylzirconium trimethoxide, bispentamethylcyclopentadienylzirconium dichloride and tributoxyzirconium monochloride, hafnium compound includes tetrabenzyl hafnium, tetraethoxide hafnium and tetrabutoxide hafnium, and vanadium compound includes vanadyl bisacetylacetonato, vanadyl triacetylacetonato, vanadyl triethoxide and vanadyl tripropoxide. Of these transition metal compounds, the titanium compounds are particularly desirable.

As the transition metal compound which constitutes the component (A) of the catalyst, there may be used a transition metal compound with two ligands having conjugated π electrons, for example, at least one compound selected from the group consisting of the transition metal compound represented by the general formula:

$$M^1R^7R^8R^9R^{10} \quad (V)$$

wherein $M^1$ is titanium, zirconium or hafnium; $R^7$ and $R^8$ are each a cyclopentadienyl group, substituted cyclopentadienyl group, indenyl group or fluorenyl group; and $R^9$ and $R^{10}$ are each a hydrogen atom, halogen, hydrocarbon radical having 1 to 20 carbon atoms, alkoxy group having 1 to 20 carbon atoms, amino group or thioalkoxy group having 1 to 20 carbon atoms, but $R^7$ and $R^8$ may be each cross-linked by a hydrocarbon radical having 1 to 5 carbon atoms, alkylsilyl group having 1 to 20 carbon atoms and 1 to 5 silicon atoms or germanium-containing hydrocarbon group having 1 to 20 carbon atoms and 1 to 5 germanium atoms.

In more detail, each of $R^7$ and $R^8$ in the above general formula (V) designates a cyclopentadienyl group, substituted cyclopentadienyl group, more specifically, methylcyclopentadienyl group; 1,3-dimethylcyclopentadienyl group; 1,2,4-trimethylcyclopentadienyl group; 1,2,3,4-tetramethylcyclopentadienyl group; pentamethylcyclopentadienyl group; trimethylsilylcyclopentadienyl group; 1,3-di(trimethylsilyl)cyclopentadienyl group; 1,2,4-tri(trimethylsilyl)cyclopentadienyl group; tert-butylcyclopentadienyl group; 1,3-di(tert-butyl)cyclopentadienyl group; 1,2,4-tri(tert-butyl)cyclopentadienyl group or the like, indenyl group, substituted indenyl group, more specifically, methylindenyl group; dimethylindenyl group; trimethylindenyl group or the like, fluorenyl group, or substituted fluorenyl group such as methylfluorenyl group, and may be the same or different and cross-linked by an alkylidene group having 1 to 5 carbon atoms, more specifically, methylidyne group; ethylidene group; propylidene group; dimethylcarbyl group or the like, or an alkylsilyl group having 1 to 20 carbon atoms and 1 to 5 silicon atoms, more specifically, dimethylsilyl group; diethylsilyl group; dibenzylsilyl group or the like. Each of $R^9$ and $R^{10}$ independently indicates, as described above but more specifically, a hydrogen atom; an alkyl group having 1 to 20 carbon atoms such as methyl group, ethyl group propyl group, n-butyl group, isobutyl group, amyl group, isoamyl group, octyl group or 2-ethylhexyl group; an aryl group having 6 to 20 carbon atoms such as phenyl group or naphthyl group; an arylalkyl group having 7 to 20 carbon atoms such as benzyl group; an alkoxyl group having 1 to 20 carbon atoms such as methoxyl group, ethoxyl group, propoxyl group, butoxyl group, amyloxy group, hexyloxy group, octyloxy group or 2-ethylhexyloxy group; an aryloxy group having 6 to 20 carbon atoms such as phenoxy group; an amino group; or a thioalkoxyl group having 1 to 20 carbon atoms.

Specific examples of the transition-metal compounds represented by the general formula (V) include bis(cyclopentadienyl)dimethyltitanium; bis(cyclopentadienyl) diethyltitanium; bis(cyclopentadienyl)dipropyltitanium; bis(cyclopentadienyl)dibutyltitanium: bis(methylcyclopentadienyl)dimethyltitanium; bis(tert-butylcyclopentadienyl)dimethyltitanium; bis(1,3-dimethylcyclopentadienyl)dimethyltitanium; bis(1,3-di-tert-butylcyclopentadienyl)dimethyltitanium; bis(1,2,4-trimethylcyclopentadienyl)dimethyltitanium; bis(1,2,3,4-tetramethylcyclopentadienyl)dimethyltitanium; bis(trimethylsilylcyclopentadienyl)dimethyltitanium; bis(1,3-di(-trimethylsilyl)cyclopentadienyl)dimethyltitanium; bis(1,2,4-tri(trimethylsilyl)cyclopentadienyl)dimethyltitanium; bis(indenyl)dimethyltitanium; bis(fluorenyl)dimethyltitanium; methylenebis(cyclopentadienyl)dimethyltitanium; ethylidenebis(cyclopentadienyl)dimethyltitanium; methylenebis(2,3,4,5-tetramethylcyclopentadienyl) dimethyltitanium; ethylidenebis(2,3,4,5-tetramethylcyclopentadienyl)dimethyltitanium; dimethylsilylbis(2,3,4,5-tetramethylcyclopentadienyl)dimethyltitanium; methylenebisindenyldimethyltitanium; ethylidenebisindenyldimethyltitanium; dimethylsilylbisindenyldimethyltitanium; methylenebisfluorenyldimethyltitanium; ethylidenbisfluorenyldimethyltitanium; dimethylsilylbisfluorenyldimethyltitanium; methylene(tert-butylcyclopentadienyl)(cyclopentadienyl)dimethyltitanium; methylene(cyclopentadienyl)(indenyl)dimethyltitanium; ethylidene(cyclopentadienyl)(indenyl)dimethyltitanium; dimethylsilyl(cyclopentadienyl)(indenyl)dimethyltitanium; methylene(cyclopentadienyl)(fluorenyl)dimethyltitanium; ethylidene(cyclopentadienyl)(fluorenyl)dimethyltitanium; dimethylsilyl(cyclopentadienyl)(fluorenyl)dimethyltitanium; methylene(indenyl)(fluorenyl)dimethyltitanium; ethylidene(indenyl)(fluorenyl)dimethyltitanium; dimethylsilyl(indenyl)(fluorenyl)dimethyltitanium; bis(cyclopentadienyl)dibenzyltitanium; bis(tert-butylcyclopentadienyl)dibenzyltitanium; bis(methylcyclopentadienyl)dibenzyltitanium; bis(1,3-dimethylcyclopentadienyl)dibenzyltitanium; bis(1,2,4-tritetramethylcyclopentadienyl)dibenzyltitanium; bis(1,2,3,4-tetramethylcyclopentadienyl)dibenzyltitanium; bis(pentamethylcyclopentadienyl)dibenzyltitanium; bis(trimethylsilylcyclopentadienyl)dibenzyltitanium; bis[1,3-di-(trimethylsilyl)cyclopentadienyl]dibenzyltitanium; bis[1,2,4-tri(trimethylsilyl)cyclopentadienyl] dibenzyltitanium; bis(indenyl)dibenzyltitanium; bis(fluorenyl)dibenzyltitanium; methylenebis(cyclopentadienyl)dibenzyltitanium; ethylidenebis(cyclopentadienyl)dibenzyltitanium; methylenebis(2,3,4,5-tetramethylcyclopentadienyl)dibenzyltitanium; ethylidenebis(2,3,4,5-tetramethylcyclopentadienyl) dibenzyltitanium; dimethylsilylbis(2,3,4,5-tetramethylcyclopentadienyl)dibenzyltitanium; methylenebis(indenyl)dibenzyltitanium; ethylidenebis(indenyl)dibenzyltitanium; dimethylsilylbis(indenyl)dibenzyltitanium; methylenebis(fluorenyl)dibenzyltitanium; ethylidenebis(fluorenyl)dibenzyltitanium; dimethylsilylbis(fluorenyl)dibenzyltitanium; methylene(cyclopentadienyl)(indenyl)benzyltitanium; ethylidene(cyclopentadienyl)(indenyl)benzyltitanium; dimethylsilyl(cyclopentadienyl)(indenyl)dibenzyltitanium; methylene(cyclopentadienyl)(fluorenyl)dibenzyltitanium; ethylidene(cyclopentadienyl)(fluorenyl)dibenzyltitanium; dimethylsilyl(cyclopentadienyl)(fluorenyl)dibenzyltitanium; methylene(indenyl)(fluorenyl)dibenzyltitanium; ethylidene(indenyl)(fluorenyl)dibenzyltitanium; dimethylsilyl(indenyl)(fluorenyl)dibenzyltitanium; biscyclopentadienyltitanium dimethoxide; biscyclopentadienyltitanium diethoxide; biscyclopentadienyltitanium dipropoxide; biscyclopentadienyltitanium dibutoxide; biscyclopentadienyltitanium diphenoxide; bis(methylcyclopentadienyl)titanium dimethoxide; bis(1,3-dimethylcyclopentadienyl)titanium dimethoxide; bis(1,2,4-trimethylcyclopentadienyl)titanium dimethoxide; bis(1,2,3,4-tetramethylcyclopentadienyl)titanium dimethoxide; bispentamethylcyclopentadienyltitanium dimethoxide; bis(trimethylsilylcyclopentadienyl)titanium dimethoxide; bis[1,3-di-(trimethylsilyl)cyclopentadienyl]titanium dimethoxide; bis[1,2,4-tri(trimethylsilyl)cyclopentadienyl] titanium dimethoxide; bisindenyltitanium dimethoxide; bisfluorenyltitanium dimethoxide; methylenebiscyclopentadienyltitanium dimethoxide; ethylidenebiscyclopentadienyltitanium dimethoxide; methylenebis(2,3,4,5-tetramethylcyclopentadienyl)titanium dimethoxide; ethylidenebis(2,3,4,5-tetramethylcyclopentadienyl)titanium dimethoxide; dimethylsilylbis(2,3,4,5-tetramethylcyclopentadienyl)titanium dimethoxide; methylenebisindenyltitanium dimethoxide; methylenebis(methylindenyl)titanium dimethoxide; ethylidenebisindenyltitanium dimethoxide; dimethylsilylbisindenyltitanium dimethoxide; methylenebisfluorenyltitanium dimethoxide; methylenebis(methylfluorenyl)titanium dimethoxide; ethylidenebisfluorenyltitanium dimethoxide; dimethylsilylbisfluorenyltitanium dimethoxide; methylene(cyclopentadienyl)(indenyl)titanium dimethoxide; ethylidene(cyclopentadienyl)(indenyl)titanium dimethoxide dimethylsilyl(cyclopentadienyl)(indenyl)titanium dimethoxide; methylene(cyclopentadienyl)(fluorenyl)titanium dimethoxide; ethylidene(cyclopentadienyl)(fluorenyl)titanium dimethoxide; dimethylsilyl(cyclopentadienyl)(fluorenyl)titanium dimethoxide; methylene(indenyl)(fluorenyl)titanium dimethoxide; ethylidene(indenyl)(fluorenyl)titanium dimethoxide; dimethylsilyl(indenyl)(fluorenyl)titanium dimethoxide, etc.

Examples of the transition metal compounds represented by the formula (V) wherein $M^1$ is zirconium include ethylidenebiscyclopentadienylzirconium dimethoxide, dimethylsilylbiscyclopentadienylzirconium dimethoxide, etc. Examples of the hafnium compounds according to the general formula (V) include ethylidenebiscyclopetadienylhafnium dimethoxide, dimethylsilylbiscyclopentadienylhafnium dimethoxide, etc. Particularly desirable transition-metal compounds among them are titanium compounds.

In addition to the combinations of the above, the compound may be a bidentate coordination complex such as 2,2'-thiobis(4-methyl-6-tert-butylphenyl)titanium diisopropoxide and 2,2'-thiobis(4-methyl-6-tert-butylphenyl)titanium dimethoxide.

The component (B) which constitutes the primary ingredients of the catalyst together with the above mentioned component (A) is a coordination complex compound comprising an anion in which a plurality of radicals are bonded to a metal and a nitrogen-containing cation having an acid dissociation constant at 25° C. of 7 or less. A variety of such coordination complex compounds are available. The anion in which a plurality of radicals are bonded to a metal is exemplified by those represented by the following general formula (VI):

$$(M^2X^1X^2---X^n)^{(n-m)-} \qquad (VI)$$

wherein $M^2$ is a metal selected from Groups 5 to 15 of the Periodic Table; $X^1$ to $X^n$ are each a hydrogen atom, dialkylamino group, alkoxy group, aryloxy group, alkyl group having 1 to 20 carbon atoms, aryl group having 6 to 20 carbon atoms, alkylaryl group, arylalkyl group, substituted alkyl group, organometalloid group or halogen atom; m is the valency of $M^2$, indicating an integer of 1 to 7; and n is an integer of 2 to 8.

Specific examples of $M^2$ include B, Al, Si, P, As, Sb, etc.; Specific examples of $X^1$ to $X^n$ include dialkylamino group such as dimethylamino and diethylamino; alkoxyl group such as methoxy, ethoxy and n-butoxy; aryloxy group such as phenoxy, 2,6-dimethylphenoxy and naphthyloxy; alkyl group having 1 to 20 carbon atoms such as methyl, ethyl, n-propyl, iso-propyl, n-butyl, n-octyl and 2-ethylhexyl; aryl group having 6 to 20 carbon atoms, alkylaryl group or arylalkyl group such as phenyl, p-tolyl, benzyl, pentafluorophenyl, 3,5-di(trifluoromethyl)phenyl, 4-tert-butylphenyl, 2,6-dimethylphenyl, 3,5-dimethylphenyl, 2,4-dimethylphenyl and 1,2-dimethylphenyl; halogen such as F, Cl, Br and I; and organometalloid such as pentamethylantimony group, trimethylsilyl group, trimethylgermyl group, diphenylarsine group, dicyclohexylantimony group and diphenylboron group.

A variety of nitrogen-containing cations having an acid dissociation constant at 25° C. (especially in an aqueous solution) of 7 or less are available and exemplified by pyridinium, 2,4-dinitro-N,N-diethylanilinium, diphenylammonium, p-nitroanilinium, 2,5-dichloroaniline, p-nitro-N,N-dimethylanilinium, quinolinium, N,N-dimethylanilinium, N,N-diethylanilinium, methyldiphenylammonium, 8-chloroquinolinium, etc.

The component (B) of the catalyst according to the present invention is the coordination complex compound constituted of the combination of the cation and anion as described above. Among them, examples of preferably usable compounds include N,N-diethylanilinium tetra(pentafluorophenyl)borate, 8-choroquinolinium tetra(pentafluorophenyl)borate, o-chloroanilinium(hexafluoro) arsenate, pyridinium tetra(pentafluorophenyl)borate, pyrrolinium tetra(pentafluorophenyl)borate, N,N-dimethylanilinium tetra(pentafluorophenyl)borate, methyldiphenylammonium tetra(pentafluorophenyl)borate, etc.

The catalyst according to the present invention further comprises, as required, (C) a compound having an alkyl group. A variety of compounds having an alkyl group are available, and aluminum compounds having an alkyl group represented by the general formula (VII) are exemplified.

$$R^{11}{}_pAl(OR^{12})_qX^1{}_{3-p-q} \qquad (VII)$$

wherein $R^{11}$ and $R^{12}$ are each an alkyl group having 1 to 8, preferably 1 to 4 carbon atoms; $X^1$ is a hydrogen atom or a halogen atom; p satisfies the relation $0 < p \leq 3$, desirably $p = 2$ or 3, more desirably $p = 3$; and q satisfies the relation $0 \leq q < 3$, desirably $q = 0$ or 1.

Also exemplified are magnesium compounds having an alkyl group represented by the general formula (VIII)

$$R^{11}{}_2Mg \qquad (VIII)$$

wherein $R^{11}$ represents the same as above, zinc compounds having an alkyl group represented by the general formula (IX)

$$R^{11}{}_2Zn \qquad (IX)$$

wherein $R^{11}$ represents the same as above, and the like.

The above-mentioned compounds having an alkyl group are desirably aluminum compounds having an alkyl group, more desirably trialkylaluminum compounds and dialkylaluminum compounds. Examples of (C) the compounds having an alkyl group to be used in the present invention include trialkylaluminum such as trimethylaluminum, triethylaluminum, tri-n-propylaluminum, triisopropylaluminum, tri-n-butylaluminum, triisobutylaluminum and tri-tert-butylaluminum; dialkylaluminum halide such as dimethylaluminum chloride, diethylaluminum chloride, di-n-propylaluminum chloride, diisopropylaluminum chloride, di-n-butylaluminum chloride, diisobutylaluminum chloride and di-tert-butylaluminum chloride; dialkylaluminum alkoxide such as dimethylaluminum methoxide and dimethylaluminum ethoxide; dialkylaluminum hydride such as dimethylaluminum hydride, diethylaluminum hydride and diisobutylaluminum hydride; dialkylmagnesium such as dimethylmagnesium, diethylmagnesium, di-n-propylmagnesium and diisopropylmagnesium; and dialkylzinc such as dimethylzinc, diethylzinc, di-n-propylethylzinc and diisopropylzinc, and the like.

The catalyst of the present invention comprises the components (A) and (B) and optionally the component (C) a compound having an alkyl group, each as a primary ingredient, and if desired, may be incorporated with other components. The compounding ratios of the components (A), (B) and (C) vary depending on the several conditions and can not be unequivocally determined. As a general rule, however, the molar ratio of the component (A) to the component (B) is 0.1:1 to 1:0.1, and that of the component (A) to the component (C) is 1:0.1 to 1:1000.

As described herebefore, the catalyst according to the present invention exhibits a high activity for the production of a styrene polymer having a high degree of syndiotactic configuration. Hence, the present invention further provides a process for producing a styrene polymer having a high degree of syndiotactic configuration by the use of the above-stated catalyst.

The production of a styrene polymer according to the process of the present invention is put into practice by polymerizing or copolymerizing styrenic monomers such as styrene and/or a styrene derivative exemplified by an alkylstyrene, alkoxystyrene, halogenated styrene, vinyl benzoate, etc. in the presence of the catalyst comprising the foregoing components (A) and (B) and optionally the component (C) each as an essential component.

There are available a variety of methods for bringing the catalyst of the present invention into contact with a styrenic monomer, or monomers, including:

(1) A method in which the reaction product of the components (A) and (B) as the catalyst is brought into contact with a monomer or monomers to be polymerized;

(2) A method in which the component (C) is added to the reaction product of the components (A) and (B) to prepare the catalyst, which is then brought into contact with a monomer or monomers to be polymerized;

(3) A method in which the component (B) is added to the reaction product of the components (A) and (C) to prepare the catalyst, which is then brought into contact with a monomer or monomers to be polymerized; and (4) A method in which each of the components (A), (B) and (C) is added to a monomer or monomers one by one in any order.

The reaction product of the components (A) and (B) may be isolated and purified in advance.

The polymerization of a styrenic monomer or monomers may be carried out by means of bulk polymerization or solution polymerization by the use of an aliphatic hydrocarbon solvent such as pentane, hexane or heptane, an alicyclic hydrocarbon solvent such as cyclohexane or an aromatic hydrocarbon solvent such as benzene, toluene or xylene. The polymerization temperature is not specifically limited, but is usually in the range 0° to 90° C., preferably 20° to 70° C.

The molecular weight of the styrene polymer to be obtained can be effectively modified by means of polymerization reaction in the presence of hydrogen.

The styrene polymer thus obtained possesses a high degree of syndiotactic configuration. Here, the styrene polymer having a high degree of syndiotactic configuration means that its stereochemical structure is mainly of syndiotactic configuration, i.e. the stereostructure in which phenyl groups or substituted phenyl group as side chains are located alternately at opposite directions relative to the main chain consisting of caron-carbon bonds. Tacticity is quantitavely determined by the nuclear magnetic resonance method ($^{13}$C-NMR method) using carbon isotope. The tacticity as determined by the $^{13}$C-NMR method can be indicated in terms of proportions of structural units continuously connected to each other, i.e., a diad in which two structural units are connected to each other, a triad in which three structural units are connected to each other and a pentad in which five structural units are connected to each other. "The styrene polymers having a high degree of syndiotactic configuration" as mentioned in the present invention means polystyrene, poly(alkylstyrene), poly(halogenated styrene), poly(alkoxystyrene), poly(vinyl benzoate), the mixtures thereof, and copolymers containing the above polymers as main components, having such a syndiotacticity that the proportion of racemic diad is at least 75%, preferably at least 85%, or the proportion of racemic pentad is at least 30%, preferably at least 50%. The poly(alkylstyrene) include poly(methylstyrene), poly(ethylstyrene), poly(isopropylstyrene), poly(tert-butylstyrene), etc., poly(halogenated styrene) include, poly(chlorostyrene), poly(bromostyrene), and poly(fluorostyrene), etc. The poly(alkoxystyrene)include, poly(methoxystyrene), poly(ethoxystyrene), etc.

The most desirable styrene polymers are polystyrene, poly(p-methylstyrene), poly(m-methylstyrene), poly(p-tert-butylstyrene), poly(p-chlorostyrene), poly(m-chlorostyrene), poly(p-fluorostyrene), and the copolymer of styrene and p-methylstyrene.

The styrene polymer obtained according to the progress of the present invention is that with a high degree of syndiotaticity usually having a weight-average molecular weight of 10,000 to 3,000,000, preferably 100,000 to 1,500,000 with a number-average molecular weight of 5,000 to 1,500,000, preferably 50,000 to 1,000,000. Moreover, the styrene polymer having an exceptionally high degree of syndiotacticity as well as an extremely high purity can be obtained by the steps of deashing treatment of the polymer thus obtained, as required, with a washing agent containing hydrochloric acid, etc.; additional washing; drying under reduced pressure; cleaning with a solvent such as methyl ethyl ketone for removing solubles therein; and treatment of the insolubles thus oftained by the use of chloroform, etc.

The styrene polymer with a high degree of syndiotacticity has a melting point of 160° to 310° C. and is remarkably superior to the conventional styrene polymer with an atactic configuration in terms of heat resistance.

The catalyst according to the present invention is inexpensive as compared with the conventional catalyst comprising an aluminoxane as a primary ingredient, exhibits a high activity for the production of a styrene polymer having a high degree of syndiotactic configuration, and is capable of minimizing the total residual content of metallic components and simplifying the production process of the polymer. According to the process of the present invention, therefore, a syndiotactic styrene polymer is obtained at a reduced production cost and with an enhanced efficiency.

The present invention will be described in more detail with reference to the following nonlimiting Examples and Comparative Examples.

EXAMPLE 1

In a 20 ml vessel which had been dried and purged with nitrogen were placed 10 ml of styrene, 15 μmol of triisobutylaluminum and 0.25 μmol of N,N-dimethylanilinium tetra(pentafluorophenyl)borate (DMAB) having an acid dissociation constant pKa of 5.2. After one (1) minute, 0.25 μmol of pentamethylcyclopentadienyltrimethyltitanium was gradually added to the resultant mixture to effect polymerization at 70° C. for 4 hours. After the completion of the reaction, the reaction product was dried to obtain 3.25 g of polymer, which was sliced to a thickness of 1 mm or less and subjected to extraction with a Soxhlet extractor for 6 hours using methyl ethyl ketone as the solvent to obtain an extraction residue (methyl ethyl ketone insoluble portion; MIP) of 96% by weight. As the result, syndiotactic polystyrene (SPS) was obtained with a yield of 3.12 g, an activity of 261 (kg/g Ti) and a total residual content of metallic components of 133 ppm.

EXAMPLE 2

The procedure in Example 1 was repeated except that 0.25 μmol of pyridinium tetra(pentafluorophenyl)borate (PAB) having an acid dissociation constant pKa of 5.2 was used in place of DMAB, and 0.25 μmol of pentamethylcyclopentadienyltribenzyltitanium was used in place of pentamethylcyclopentadienyl-trimethyltitanium to obtain 3.27 g of polymer. The polymer thus obtained was sliced to a thickness of 1 mm or less and subjected to extraction with a Soxhlet extractor for 6 hours using methyl ethyl ketone as the solvent to obtain an extraction residue (methyl ethyl ketone insoluble portion; MIP) of 96% by weight. As the result, SPS was obtained with a yield of 3.14 g, an activity of 263 (kg/g Ti) and a total residual content of metallic components of 133 ppm.

EXAMPLE 3

The procedure in Example 1 was repeated except that 0.25 μmol of m-nitrophenyldimethylammonium tetra(-pentafluorophenyl)borate (MNAB) having an acid dissociation constant pKa of 3.0 was used in place of DMAB to obtain 2.21 g of polymer. The polymer thus obtained was sliced to a thickness of 1 mm or less and subjected to extraction with a Soxhlet extractor for 6 hours using methyl ethyl ketone as the solvent to obtain an extraction residue (methyl ethyl ketone insoluble portion; MIP) of 93% by weight. As the result, SPS was obtained with a yield of 2.06 g, an activity of 172 (kg/g Ti) and a total residual content of metallic components of 202 ppm.

EXAMPLE 4

The procedure in Example 1 was repeated except that 0.25 μmol of p-bromophenyldimethylammonium tetra(-pentafluorophenyl)borate (PBAB) having an acid dissociation constant pKa of 4.3 was used in place of DMAB to obtain 3.34 g of polymer. The polymer thus obtained was sliced to a thickness of 1 mm or less and subjected to extraction with a Soxhlet extractor for 6 hours using methyl ethyl ketone as the solvent to obtain an extraction residue (methyl ethyl ketone insoluble portion; MIP) of 95% by weight. As the result, SPS was obtained with a yield of 3.17 g, an activity of 265 (kg/g Ti) and a total residual content of metallic components of 131 ppm.

EXAMPLE 5

The procedure in Example 1 was repeated except that triisobutylaluminum was not used to obtain 0.67 g of polymer. The polymer thus obtained was sliced to a thickness of 1 mm or less and subjected to extraction with a Soxhlet extractor for 6 hours using methyl ethyl ketone as the solvent to obtain an extraction residue (methyl ethyl ketone insoluble portion; MIP) of 95% by weight. As the result, SPS was obtained with a yield of 0.63 g, an activity of 53 (kg/g Ti) and a total residual content of metallic components of 18 ppm.

EXAMPLE 6

The procedure in Example 1 was repeated except that 0.25 μmol of pentamethylcyclopentadienyltitanium trimethoxide was used in place of pentamethylcyclopentadienyltrimethyltitanium to obtain 2.53 g of polymer. The polymer thus obtained was sliced to a thickness of 1 mm or less and subjected to extraction with a Soxhlet extractor for 6 hours using methyl ethyl ketone as the solvent to obtain an extraction residue (methyl ethyl ketone insoluble portion; MIP) of 95% by weight. As the result, SPS was obtained with a yield of 2.41 g, an activity of 201 (kg/g Ti) and a total residual content of metallic components of 173 ppm.

EXAMPLE 7

In a 20 ml vessel which had been dried and purged with nitrogen were placed 10 ml of styrene, 8 μmol of triisobutylaluminum, 0.25 μmol of pentamethylcyclopentadienyltrimethyltitanium and 0.25 μmol dimethylanilinium tetra(pentafluorophenyl)borate (DMAB) having an acid dissociation constant pKa of 5.2 to effect polymerization at 70° C. for 4 hours. After the completion of the reaction, the reaction product was dried to obtain 3.01 g of polymer, which was sliced to a thickness of 1 mm or less and subjected to extraction with a Soxhlet extractor for 6 hours using methyl ethyl ketone as the solvent to give an extraction residue (methyl ethyl keton insoluble portion; MIP) of 97% by weight. As the result, syndiotactic polystyrene (SPS) was obtained with a yield of 2.91 g, an activity of 243 (kg/g Ti) and a total residual content of metallic components of 78 ppm.

EXAMPLE 8

The procedure in Example 1 was repeated except that 1.0 μmol of pentamethylcyclopentadineyltrimethylzirconium and 1.0 μmol of DMAB were used in place of 0.25 μmol of pentamethylcyclopentadienyltrimethyltitanium to obtain 1.02 g of polymer. The polymer thus obtained was sliced to a thickness of 1 mm or less and subjected to extraction with a Soxhlet extractor for 6 hours using methyl ethyl ketone as the solvent to obtain an extraction residue (methyl ethyl ketone insoluble portion; MIP) of 94% by weight. As the result, SPS was obtained with a yield of 0.96 g, an activity of 10.5 (kg/g Zr) and a total residual content of metallic components of 517 ppm.

COMPARATIVE EXAMPLE 1

The procedure in Example 1 was repeated except that ferrocenium tetra(pentafluorophenyl)borate (FCB) was used in place of DMAB, obtain 5.92 g of polymer. The polymer thus obtained was sliced to a thickness of 1 mm or less and subjected to extraction with a Soxhlet extractor for 6 hours using methyl ethyl ketone as the solvent to obtain an extraction residue (methyl ethyl ketone insoluble portion; MIP) of 42% by weight. As the result, SPS was obtained with a yield of 2.53 g, an activity of 211 (kg/g Ti) and a total residual content of metallic components of 96 ppm.

COMPARATIVE EXAMPLE 2

The procedure in Example 7 was repeated except that 0.25 μmol of triethylammonium tetra(pentafluorophenyl)borate (TEAB) having an acid dissociation contact pKa of 10.9 was used in place of DMAB to obtain 1.72 g of polymer. The polymer thus obtained was sliced to a thickness of 1 mm or less and subjected to extraction with a Soxhlet extractor for 6 hours using methyl ethyl ketone as the solvent to obtain an extraction residue (methyl ethyl ketone insoluble portion; MIP) of 93% by weight. As the result, SPS was obtained with a yield of 1.60 g, an activity of 134 (kg/g Ti) and a total residual content of metallic components of 142 ppm.

COMPARATIVE EXAMPLE 3

The procedure in Example 1 was repeated except that FCB was used in place of DMAB and triisobutylaluminum was not used to obtain 0.56 g of polymer. The polymer thus obtained was sliced to a thickness of 1 mm or less and subjected to extraction with a Soxhlet extractor for 6 hours using methyl ethyl ketone as the solvent to obtain an extraction residue (methyl ethyl ketone insoluble portion; MIP) of 75% by weight. As the result, SPS was obtained with a yield of 0.42 g, an activity of 35 (kg/g Ti) and a total residual content of metallic components of 61 ppm.

COMPARATIVE EXAMPLE 4

The procedure in Example 1 was repeated except that 0.25 mol of tri-n-butylammonium tetra(pentafluorophenyl)borate (TBAB) having an acid dissociation constant pKa of 9.9 was used in place of DMAB to obtain 1.10 g of polymer. The polymer thus obtained was sliced to a thickness of 1 mm or less and subjected to extraction with a Soxhlet extractor for 6 hours using methyl ethyl ketone as the solvent to obtain an extraction residue (methyl ethyl ketone insoluble portion; MIP) of 92% by weight. As the result, SPS was obtained with a yield of 1.01 g, an activity of 84 (kg/g Ti) and a total residual content of metallic components of 421 ppm.

COMPARATIVE EXAMPLE 5

The procedure in Example 7 was repeated except that FCB was used in place of DMAB to obtain 2.98 g of polymer. The polymer thus obtained was sliced to a thickness of 1 mm or less and subjected to extraction with a Soxhlet extractor for 6 hours using methyl ethyl ketone as the solvent to obtain an extraction residue (methyl ethyl ketone insoluble portion; MIP) of 86% by weight. As the result, SPS was obtained with a yield of 2.56 g, an activity of 214 (kg/g Ti) and a total residual content of metallic components of 95 ppm.

COMPARATIVE EXAMPLE 6

The procedure in Example 8 was repeated except that FCB was used in place of DMAB to obtain 1.84 g of polymer. The polymer thus obtained was sliced to a thickness of 1 mm or less and subjected to extraction with a Soxhlet extractor for 6 hours using methyl ethyl ketone as the solvent to obtain an extraction residue (methyl ethyl ketone insoluble portion; MIP) of 53% by weight. As the result, SPS was obtained with a yield of 0.98 g, an activity of 10.7 (kg/g Zr) and a total residual content of metallic components of 563 ppm.

What is claimed is:

1. A process for producing a styrene polymer having a high degree of syndiotacticity which consists essentially of polymerizing at least one styrenic monomer selected from the group consisting of styrene, alkylstyrene, alkoxystyrene, halogenated styrene and vinylbenzoate in the presence of a catalyst consisting essentially of (A) a titanium compound represented by the formula: TiRXYZ, wherein R represents a cyclopentadienyl group, a substituted cyclopentadienyl group or an indenyl group, a substituted indenyl group or a fluorenyl group; X, Y and Z are independently a hydrogen atom, an alkyl group having one to 12 carbon atoms, an alkoxy group having one to 12 carbon atoms, an aryl group having 6 to 20 carbon atoms, an aryloxy group having 6 to 20 carbon atoms, an arylalkyl group having 7 to 20 carbon atoms or a halogen atom, (B) a coordination complex compound comprising a tetra(pentafluorophenyl)borate anion and a nitrogen containing cation having an acid dissociation constant at 25° C. of 7 or less, and optionally (C) an organoaluminum compound, an organomagnesium compound or an organo zinc compound.

2. The process according to claim 1, wherein the coordination complex compound is selected from the group consisting of N,N-diethylanilinium tetra(pentafluorophenyl)borate, 8-chloroquinolinium tetra(pentafluorophenyl)borate, pyridinium tetra(pentafluorophenyl)borate, pyrrolinium tetra(pentafluorophenyl)borate, nitrophenyldimethylammonium tetra(pentafluorophenyl)borate, bromophenyldimethylammonium tetra(pentafluorophenyl)borate, N,N-dimethylanilinium tetra(pentafluorophenyl)borate and methyldiphenylammonium tetra(pentafluorophenyl)borate.

3. The process according to claim 1, wherein said catalyst component (C) is an organoaluminum compound in which the aluminum compound has at least one alkyl group.

4. The process according to claim 1, wherein the titanium compound (A) is represented by the formula:

$$\text{Ti R X Y Z} \qquad (III)$$

wherein R represents a pentamethylcyclopentadienyl group; X, Y, and Z are independently a hydrogen atom, an alkyl group having 1 to 12 carbon atoms, an alkoxy group having 1 to 12 carbon atoms, an aryl group having 6 to 20 carbon atoms, an aryloxy group having 6 to 20 carbon atoms, an arylalkyl group having 7 to 20 carbon atoms or halogen atom.

5. The process according to claim 4, wherein the titanium compound (A) is represented by the formula:

$$\text{Ti R X Y Z} \qquad (III)$$

wherein R represents a pentamethylcyclopentadienyl group; X, Y and Z are independently an alkyl group having 1 to 12 carbon atoms, an alkoxy group having 1 to 12 carbon atoms or an arylalkyl group having 7 to 20 carbon atoms.

* * * * *